US008099753B2

(12) United States Patent
White et al.

(10) Patent No.: US 8,099,753 B2
(45) Date of Patent: Jan. 17, 2012

(54) SYSTEM FOR MITIGATING SIGNAL INTERRUPTION IN A SATELLITE COMMUNICATION SYSTEM

(75) Inventors: Scott White, Austin, TX (US); Ankur Mukerji, Austin, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 745 days.

(21) Appl. No.: 11/846,579

(22) Filed: Aug. 29, 2007

(65) Prior Publication Data

US 2009/0064238 A1 Mar. 5, 2009

(51) Int. Cl.
 *H04N 7/20* (2006.01)
(52) U.S. Cl. ......................................................... 725/68
(58) Field of Classification Search .................... 725/68; 348/558
 See application file for complete search history.

(56) References Cited

U.S. PATENT DOCUMENTS

| | | | | |
|---|---|---|---|---|
| 6,169,881 B1 * | 1/2001 | Astrom et al. | | 455/12.1 |
| 6,445,907 B1 * | 9/2002 | Middeke et al. | | 455/226.1 |
| 6,532,593 B1 * | 3/2003 | Moroney | | 725/142 |
| 2002/0059619 A1 | 5/2002 | Lebar | | |
| 2002/0059637 A1 * | 5/2002 | Rakib | | 725/119 |
| 2003/0050015 A1 * | 3/2003 | Kelly et al. | | 455/67.4 |
| 2003/0058810 A1 * | 3/2003 | Petronic | | 370/316 |
| 2004/0052504 A1 * | 3/2004 | Yamada et al. | | 386/68 |
| 2005/0272370 A1 * | 12/2005 | Schiff | | 455/13.3 |
| 2007/0027976 A1 * | 2/2007 | Sasame et al. | | 709/223 |
| 2007/0153815 A1 * | 7/2007 | She et al. | | 370/401 |
| 2008/0086743 A1 * | 4/2008 | Cheng et al. | | 725/38 |
| 2008/0172700 A1 * | 7/2008 | Jensen et al. | | 725/63 |
| 2008/0282299 A1 * | 11/2008 | Koat et al. | | 725/93 |
| 2009/0199013 A1 * | 8/2009 | Raciborski | | 713/176 |

FOREIGN PATENT DOCUMENTS

JP 9036790 2/1997

* cited by examiner

*Primary Examiner* — Andrew Koenig
*Assistant Examiner* — Alfonso Castro
(74) *Attorney, Agent, or Firm* — Guntin Meles & Gust, PLC; Pablo Meles (57) ABSTRACT

A system that incorporates teachings of the present disclosure may include, for example, a satellite media receiver having a controller adapted to detect a service outage associated with a media program derived from satellite signals supplied to a satellite port of the satellite media receiver, and transmit a request for a portion of the media program for delivery to a broadband port of the satellite media receiver to mitigate the service outage. Other embodiments are disclosed.

22 Claims, 5 Drawing Sheets

SYSTEM FOR MITIGATING SIGNAL INTERRUPTION IN A SATELLITE COMMUNICATION SYSTEM

FIELD OF THE DISCLOSURE

The present disclosure relates generally to satellite communication services and more specifically to a system for mitigating signal interruption in a satellite communication system.

BACKGROUND

Satellite media receivers can now provide HDTV programming, parental controls, video on demand (VoD) services, digital video recording (DVR) services, and numerous other features that consumers can enjoy in the privacy of their home or office. These services however can be interrupted by inclement weather, a misaligned satellite dish, or some other source of interruption. When this happens, the consumer can miss an opportunity to view or record a media program of interest.

DETAILED DESCRIPTION

In one embodiment of the present disclosure, a computer-readable storage medium can have computer instructions for detecting a service outage of a media program consumed by a satellite media receiver by way of a satellite port of the satellite media receiver which receives satellite signals from a satellite dish system. retrieving at least a portion of the media program, transcoding the portion of the media program for transmission over an Internet Service Provider (ISP) network to the satellite media receiver via a gateway coupled to the ISP network and coupled to a broadband port of the satellite media receiver, and transmitting the transcoded portion of the media program over the ISP network to the broadband port of the satellite media receiver via the gateway.

In one embodiment of the present disclosure, a satellite media receiver can have a controller adapted to detect a service outage associated with a media program derived from satellite signals supplied to a satellite port of the satellite media receiver, and transmit a request for a substitute portion of the media program for delivery to a broadband port of the satellite media receiver to mitigate the service outage.

In one embodiment of the present disclosure, a method can involve supplying backup satellite media program services, comprising transmitting to a satellite media receiver a substitute portion of a media program responsive to detecting a service outage associated with a primary media program processed by the satellite media receiver.

In one embodiment of the present disclosure, a portal can have a controller to present a portable communication device over an ISP network a substitute portion of a media program supplied by a satellite media receiver responsive to the satellite media receiver detecting a service outage associated with a primary media program processed by the satellite media receiver.

Figure 1:
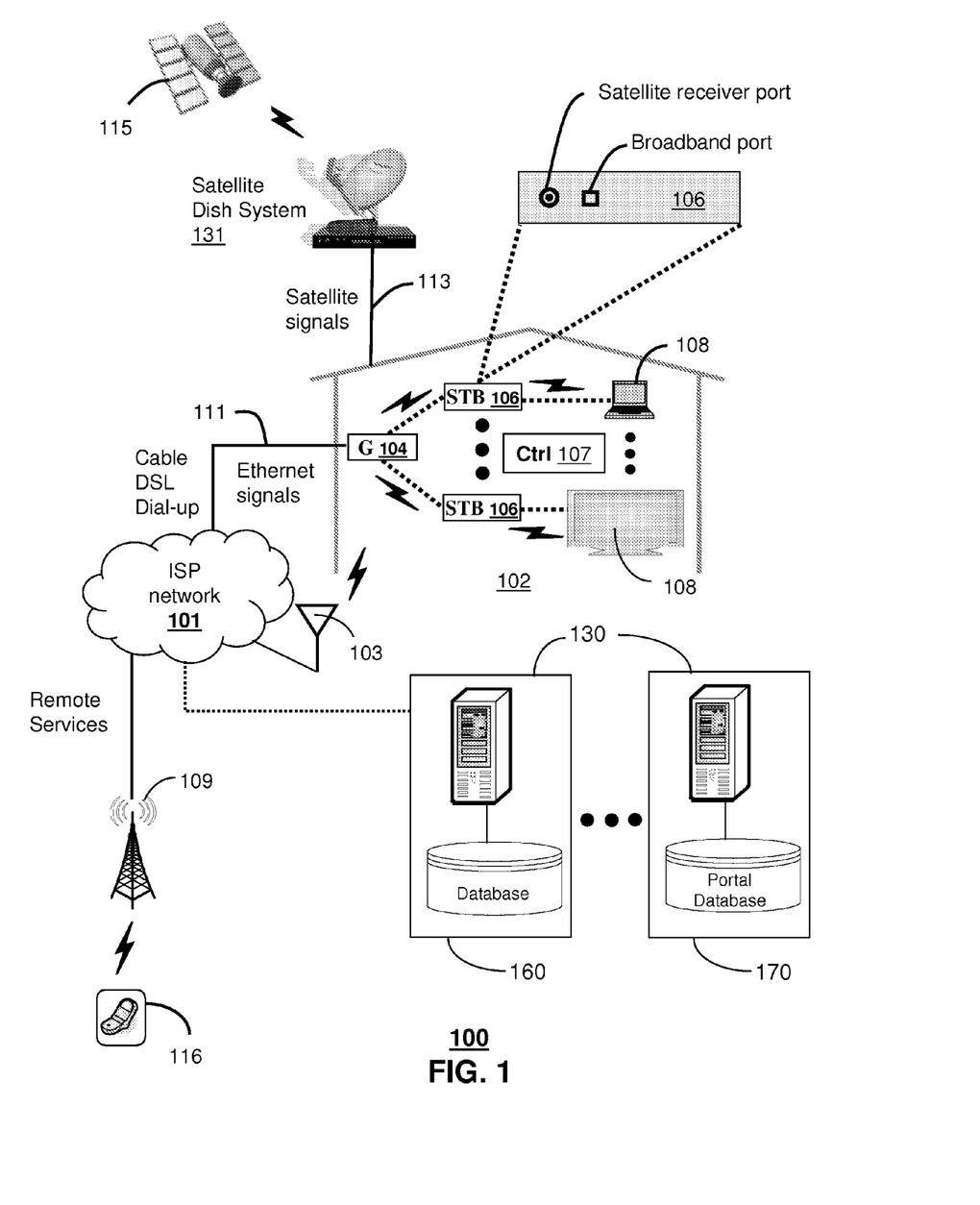
FIG. 1 depicts an exemplary embodiment of a satellite communication system.

FIG. 1 depicts an exemplary embodiment of a satellite communication system 100. The satellite communication system 100 can comprise a satellite dish system 131 that delivers multimedia satellite services from one or more satellites 115 to a residence or commercial establishment ("building") 102. A gateway 104 residing in building 102 can be used to distribute a portion of Ethernet signals 111 and satellite signals 113 to one or more satellite media receivers 106 such as satellite Set-Top Boxes (STBs) for presenting satellite multimedia services to media devices 108 such as a computer, cell phone, portable music player, or analog or digital television set (e.g., plasma TV). Alternatively, the satellite media receivers 106 can be coupled to the satellite dish system 131 and thereby receive the satellite signals 113 directly without intervention by the gateway 104.

The satellite media receiver 106 can be supplied to subscribers by a satellite broadcast communications provider for purposes of delivering satellite media services to media devices 108. Satellite programs can be distributed to media devices 108 by common wired (e.g., coax or optical cable) or wireless means (e.g., WiFi). A media controller 107 such as a common remote controller can be used to control the satellite media receiver 106 and/or the media device 108. The media controller 107 can utilize common infrared or RF signaling technology to communicate with one or more of the aforementioned subsystems of the satellite communication system 100. The media controller 107 can also include a common display (e.g., LCD) for presenting a user interface (UI) for controlling operations of the satellite media receiver 106.

The satellite communication system 100 can utilize computing devices 130 employing common computing and communications technology for several purposes. For example, a portion of the computing devices 130 can serve as a web server or portal 160 to provide portal services to subscribers of the satellite communication system 100. The computing devices 130 can also represent a backup media system 170 which can be utilized for providing backup media services to subscribers. The computing devices 130 can access the satellite media receivers 106 over an Internet Service Provider (ISP) network 101 by wireline or wireless means 103 (such as WiMAX or other suitable wireless technologies).

Figure 2:
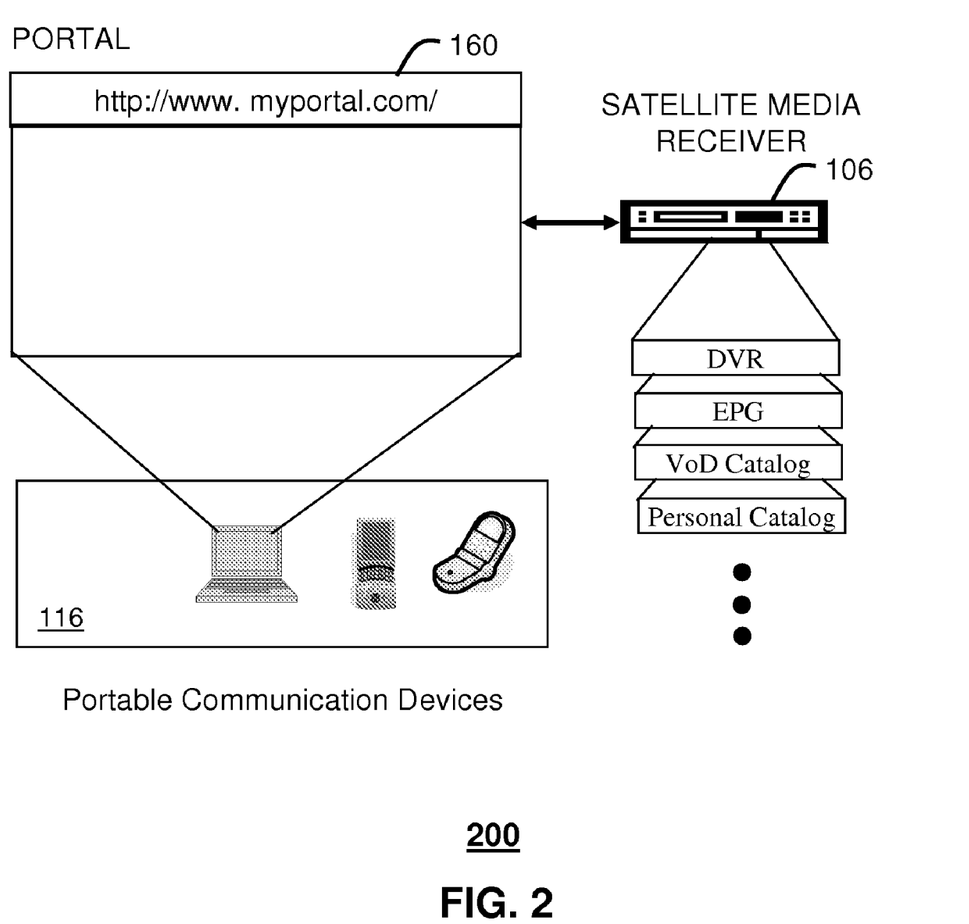
FIGS. 2-4 depict exemplary embodiments of a portal of the satellite communication system.
Figure 3:
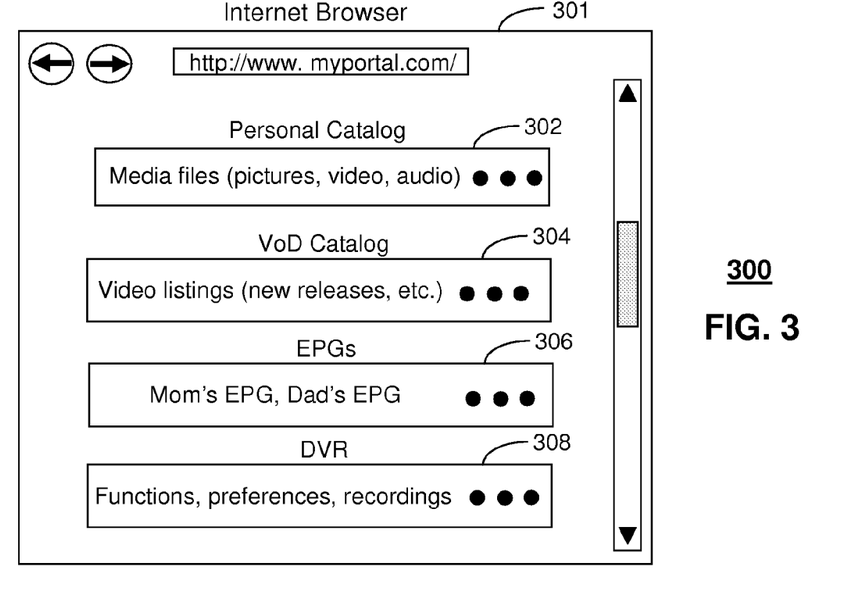
Figure 4:
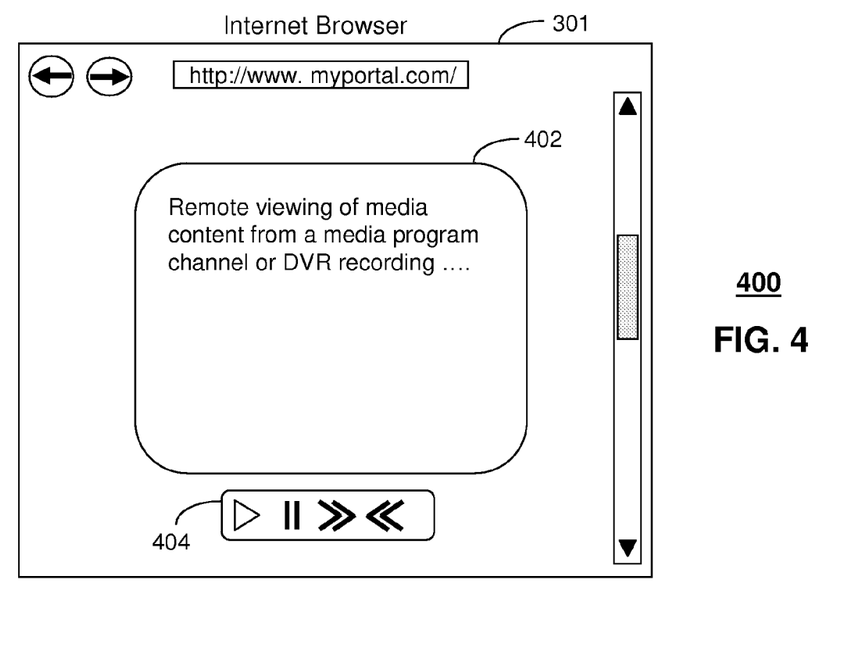

FIGS. 2-4 depict exemplary embodiments of the portal 160. In FIG. 2, the portal 160 can be accessed by a URL with a common browser such as Microsoft's Internet Explorer. The portal 160 can be configured to access a satellite media receiver 106 such as the STB of FIG. 1 and services managed thereby such as a Digital Video Recorder (DVR), an Electronic Programming Guide (EPG), Video on Demand (VoD) catalog, a personal catalog stored in a memory of the satellite media receiver 106 (e.g., personal videos, pictures, audio recordings, etc.) by way of the gateway 104. FIG. 3 depicts a Graphical User Interface (GUI) window 302-308 of the Internet browser 301 presented by the portal 160 using HTML language for navigating through a personal catalog stored in the satellite media receiver 106, a VoD catalog of the satellite communication system 100, EPGs (customized by the subscriber or otherwise provided by the service provider of the satellite communication system), and DVR preferences, functions and recordings, among other functions and settings.

The satellite media receiver 106 can stream information associated with an item selected from the GUI windows 302-308 such as for example a VoD program, a TV program, a DVR recording, or a media file of a personal catalog.

Streamed media supplied by the satellite media receiver 106 can be presented by way of a media player (e.g., Quick-Time™, Windows Media Player™, Real Player™, etc.) operating in the recipient portable communication device 116 (cell phone or laptop computer) remotely accessing the STB by way of the portal 160. The streamed media can be audio only content, video only content, or combinations thereof in a GUI window 402 that can be managed by GUI controls 404 of the media player (e.g., play, stop, rewind, etc.) as shown in FIG. 4. The selection can take place by common means provided by common Internet browsers (e.g., mouse pointer with a selection buttons).

Figure 5:
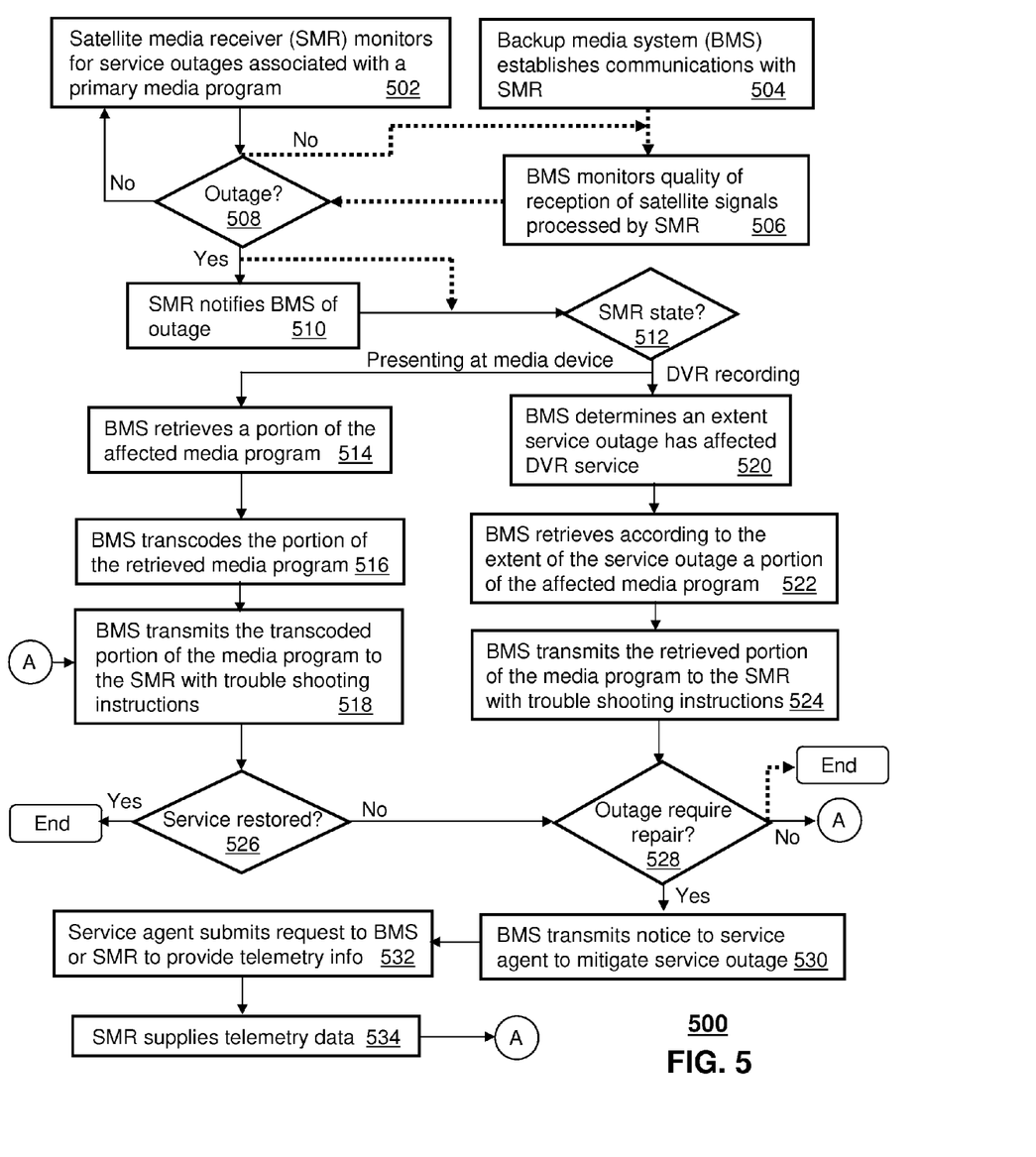
FIG. 5 depicts an exemplary method operating in portions of the satellite communication system.

FIG. 5 depicts an exemplary method 500 operating in portions of the satellite communication system 100. Method 500 begins with step 502 in which a satellite media receiver 106 (referred to herein as SMR 106) monitors service outages associated with a primary media program. A primary media program can represent media content (such as audio or video content) actively being processed by the SMR 106 tuned to a specific channel of the satellite signals 113 for purposes of presentation at a media device 108 or recording by a DVR service managed by the SMR. The DVR service can be an integral part of the SMR 106 or can be a device coupled to the SMR which the SMR manages by common means.

Alternatively, or in combination, the backup media system 170 (referred to herein as BMS 170) can be configured to establish communications with the SMR 106 in step 504 by way of the gateway 104 over the ISP network 101. To secure communications with the BMS 170, the gateway 104 can employ a security method such as an authentication, authorization, and accounting technique (commonly referred to as AAA). In step 506, the BMS 170 can monitor a quality of reception of satellite signals processed by the SMR 106 from telemetry information supplied by the SMR. The telemetry information can include for example, an indication that there is a partial or complete service outage, and/or distortion metrics associated with the satellite signal (packet losses, bit error rate, jitter, etc.).

The SMR 106 and BMS 170 will in step 508 continue the monitoring process until a service outage is detected. If a service outage has been detected by the SMR 106 in step 508, the SMR proceeds to step 510 where it proactively transmits a notice to the BMS 170 indicating that an outage has been detected. The notification can include for example the extent of the service outage, the time the service outage occurred, which media program(s) was/were affected, the processing state of the SMR 106 when the service outage occurred (e.g., presenting media program at a media device 108, or recording media program via the DVR service) and telemetry information associated with the outage. Alternatively, if the BMS 170 detects the service outage from its own monitoring process, step 510 can be skipped, and the BMS proceeds to step 512.

From step 512 the BMS 170 proceeds to step 514 when it determines the service outage occurred while the affected media program was being presented at a media device 108, or step 520 when the service outage occurred during a recording session of the affected media program by a DVR service managed by the SMR 106. When the former case is detected, the BMS 170 retrieves in step 514 a portion of the affected media program from a database of media programs according to the extent of the service outage detected. The database can be an integral database of media programs managed by the BMS 170, or a remote database that stores a catalog of media programs managed by a service provider of media content presented by the satellite communication system 100.

Suppose for example that the media program was interrupted 10 minutes after its initial presentation. The BMS 170 in this instance can retrieve the remaining portion rather the entire program. If fractional retrievals are not available, the BMS 170 can retrieve the entire media program and ignore the first 10 minutes of play. In this context, the portion retrieved in step 514 can mean a full retrieval of the media program with a skip-ahead step.

In step 516, the BMS 106 can transcode the portion of the media program to be transmitted to the SMR 106 according to the broadband capabilities of the SMR. The BMS 170 can thus adjust the transcoding process so that it matches for example a specific data rate and Quality of Service (QoS) of the SMR 106 so that it produces streamed data in step 518 that is reliable and provides the best quality of presentation possible.

It should be noted that the streamed data can be formatted as a progressive download so that it can be presented at the media device 108 while the streamed information continues to be transmitted to the SMR 106. With this technique, an interruption of a media program can be quickly substituted thereby minimizing the interruption period experienced by a subscriber of the SMR 106. It should also be noted that a QoS of the affected primary media program received over the satellite signals 113 can be greater than the QoS of the substitute transcoded media program since the broadband port of the SMR 106 is likely to have less bandwidth than what is received by the SMR over the dish system 131. Nevertheless, the substitute media program provides a means to mitigate program interruptions which helps to maintain a level of satisfaction of the subscriber that is greater than it would be if the interruption was not mitigated.

In step 526, the BMS 170 can determine if the affected service has been restored. This step can be accomplished by the SMR 106 notifying the BMS 170 when it detects that the affected primary media program has been restored. Alternatively, the BMS 170 can periodically probe the SMR 106 as described earlier in step 506 to make this determination. If the BMS 170 determines that service has been restored, it ceases to transmit the transcoded media program and method 500 is repeated when future interruptions are detected. If service has not been restored, the BMS 170 can proceed to step 528 where it determines if the service outage is due to inclement weather (i.e., a temporary outage) or some other form of a service outage that may require field repair.

In the first instance, the BMS 170 can determine a location of the SMR 106 from a subscriber account indexed by for example a serial number, a MAC address or other suitable identifier of the SMR. With the location information the BMS 170 can determine weather conditions in a vicinity of the affected SMR 106. If weather conditions are poor, and perhaps other SMRs 106 have indicated a service outage, then the BMS 170 can determine that the service outage is likely to be temporary and there is no need to submit a repair ticket to a service agent of the satellite communication system 100 in step 530. Under these circumstances the BMS 170 continues to monitor in step 526 for restoration of the affected media program.

If on the other hand a service outage is determined to be caused by a system fault (e.g., a fault in a tuner of the SMR 106, a fault in connectivity between the SMR and the dish system 131, etc.), the BMS 170 can generate a notice with a repair ticket directed to a service agent to mitigate the service outage. The service agent in step 532 can with a common computer terminal submit a request to the BMS 170 or directly to the SMR 106 by way of the ISP network 101 to retrieve in step 534 the telemetry information gathered in steps 510 or 506, or additional telemetry information of the SMR as required to diagnose the outage. The service agent can use this information to determine if the repair can be made remotely, or if a field technician needs to be sent to the location of the SMR 106. Whether or not repairs are required or the outage is temporary, the BMS 170 can continue to provide substitute media program service to the SMR 106 in step 518 until the BMS detects in step 526 that service has been restored.

Referring back to step 512, if the BMS 170 determines that the outage occurred during a DVR recording, the BMS proceeds to step 520 where it determines the extent that the service outage has affected the DVR recording. If for example the service outage caused a corruption of the DVR recording, the BMS 170 can be programmed to retrieve the entire media program in step 522. If the outage caused loss of only part of the media program, the BMS 170 can retrieve the portion of the media program needed to restore the unrecorded portion. Since DVR recording is a non-real-time event, the BMS 170 can download in step 524 the substitute media program to the SMR 106 without having to transcode it first. By avoiding the transcoding step, the BMS 170 can provide a copy of the media program to the DVR service managed by the SMR 106 in the highest audible and/or viewing quality possible. During or after the substitute media program is downloaded to the SMR 106, the BMS 170 can proceed to step 528 to determine if the outage requires repair services. If not, method 500 ceases, and is applied to future outages. Otherwise, the BMS 170 proceeds to steps 530-534 as previously described.

Upon reviewing the aforementioned embodiments, it would be evident to an artisan with ordinary skill in the art that said embodiments can be modified, reduced, or enhanced without departing from the scope and spirit of the claims described below. For example, steps 518 and 524 can be supplemented so that troubleshooting instructions can be transmitted to the SMR 106 with the substitute media program. The troubleshooting instructions can be transmitted in instances where the BMS 170 determines that the service outage is temporary and can be corrected by the subscriber (e.g., misaligned dish system 131).

Alternatively, or in combination, the BMS 170 can also transmit a notice to the subscriber that a substitute media program is being transmitted to the SMR 106 due to detected service outage. The notice can be shown at the media device 108 while the substitute media program is being presented, or can be attached to the substitute media program downloaded to the DVR service and presented when the recording is selected by the subscriber of the SMR 106.

In yet another embodiment, steps 522-524 can be replaced with steps 516-518. In this embodiment, the BMS 170 retrieves the media program, transcodes it, and streams it to the SMR 106 for recording by the DVR. In another embodiment, method 500 can be applied in part while a subscriber is remotely accessing the SMR 106 by way of portal 160. Thus, if a subscriber is remotely viewing or listening to media content via portal 160, a service interruption can be mitigated with method 500.

These are but a few examples of modifications that can be applied to the present disclosure without departing from the scope of the claims. Accordingly, the reader is directed to the claims section for a fuller understanding of the breadth and scope of the present disclosure.

Figure 6:
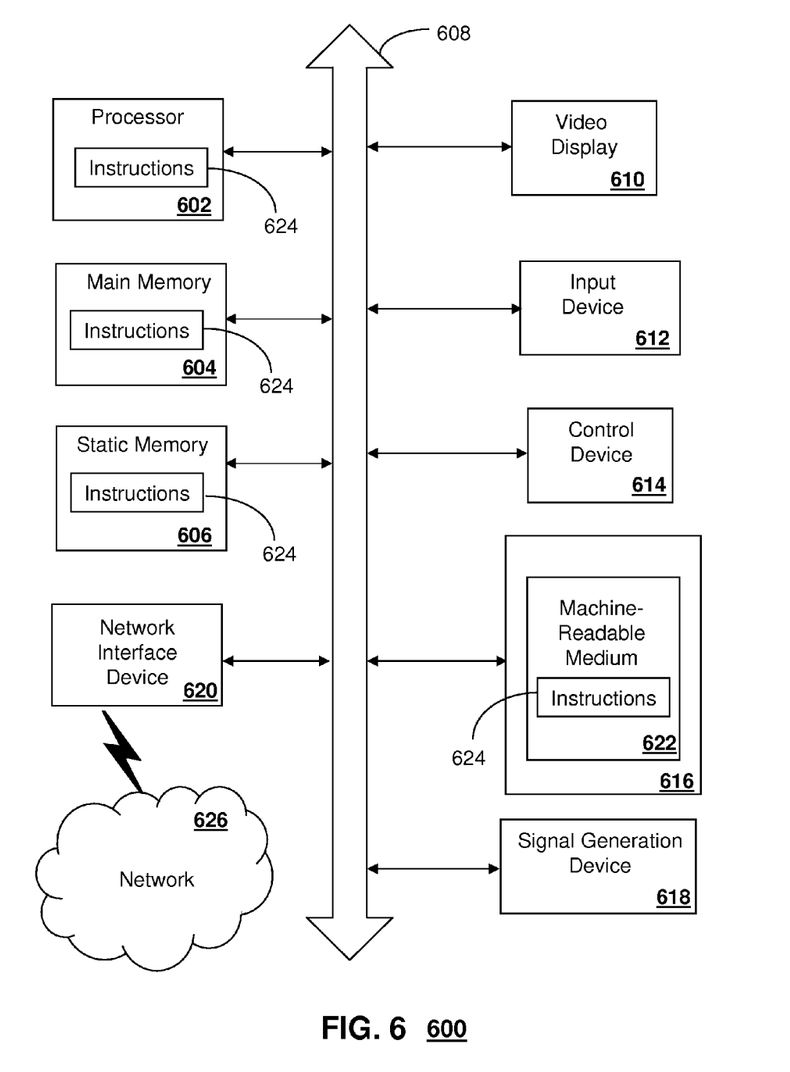
FIG. 6 is a diagrammatic representation of a machine in the form of a computer system within which a set of instructions, when executed, may cause the machine to perform any one or more of the methodologies discussed herein.

FIG. 6 depicts an exemplary diagrammatic representation of a machine in the form of a computer system 600 within which a set of instructions, when executed, may cause the machine to perform any one or more of the methodologies discussed above. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. It will be understood that a device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 600 may include a processor 602 (e.g., a central processing unit (CPU), a graphics processing unit (GPU, or both), a main memory 604 and a static memory 606, which communicate with each other via a bus 608. The computer system 600 may further include a video display unit 610 (e.g., a liquid crystal display (LCD), a flat panel, a solid state display, or a cathode ray tube (CRT)). The computer system 600 may include an input device 612 (e.g., a keyboard), a cursor control device 614 (e.g., a mouse), a disk drive unit 616, a signal generation device 618 (e.g., a speaker or remote control) and a network interface device 620.

The disk drive unit 616 may include a machine-readable medium 622 on which is stored one or more sets of instructions (e.g., software 624) embodying any one or more of the methodologies or functions described herein, including those methods illustrated above. The instructions 624 may also reside, completely or at least partially, within the main memory 604, the static memory 606, and/or within the processor 602 during execution thereof by the computer system 600. The main memory 604 and the processor 602 also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine readable medium containing instructions 624, or that which receives and executes instructions 624 from a propagated signal so that a device connected to a network environment 626 can send or receive voice, video or data, and to communicate over the network 626 using the instructions 624. The instructions 624 may further be transmitted or received over a network 626 via the network interface device 620.

While the machine-readable medium 622 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure.

The term "machine-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and carrier wave signals such as a signal embodying computer instructions in a transmission medium; and/or a digital file attachment to e-mail or other self-contained information archive or set of archives is considered a distribution medium equivalent to a tangible storage medium. Accordingly, the disclosure is considered to include any one or more of a machine-readable medium or a distribution medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A non-transitory computer-readable storage medium, comprising computer instructions for:
    detecting a service outage of a media program consumed by a satellite media receiver by way of a satellite port of the satellite media receiver which receives satellite signals from a satellite dish system;
    if the service outage occurs during a digital video recorder recording, then determining an extent that the service outage has affected the digital video recorder recording;
    retrieving at least a portion of the media program in response to detecting the service outage and without a request for the media program being transmitted by the satellite media receiver, wherein an entire media program is retrieved when the service outage caused a corruption of the digital video recorder recording and wherein only a portion of the media program needed to restore an unrecorded portion is retrieved when the service outage caused loss of only a part of the media program;
    transcoding the portion of the media program for transmission over an Internet Service Provider network to the satellite media receiver via a gateway coupled to the Internet Service Provider network and coupled to a broadband port of the satellite media receiver;
    transmitting the transcoded portion of the media program over the Internet Service Provider network to the broadband port of the satellite media receiver via the gateway;
    performing the transcoding and transmitting steps responsive to detecting that the service outage occurred while the satellite media receiver was presenting the media program at a media device; and
    transmitting to a digital video recorder service managed by the satellite media receiver over the Internet Service Provider network the retrieved portion of the media program without transcoding responsive to detecting that the service outage occurred while the satellite media receiver was recording the media program.

2. The non-transitory computer-readable storage medium of claim 1, comprising computer instructions for receiving from the satellite media receiver a notice of the service outage of the media program.

3. The non-transitory computer-readable storage medium of claim 1, comprising computer instructions for:
    establishing communications with the satellite media receiver over the Internet Service Provider network by way of the gateway;
    monitoring a quality of reception of the satellite signals received by the satellite media receiver; and
    detecting the service outage from a degradation in the quality of reception.

4. The non-transitory computer-readable storage medium of claim 1, comprising computer instructions for transmitting the transcoded portion of the media program as a streaming signal.

5. The non-transitory computer-readable storage medium of claim 1, comprising computer instructions for determining an extent of the service outage affecting the digital video recorder service to determine an appropriate portion of the media program that mitigates the service outage.

6. The non-transitory computer-readable storage medium of claim 1, comprising computer instructions for transmitting a service outage notice to a service agent to mitigate the service outage.

7. The non-transitory computer-readable storage medium of claim 1, comprising computer instructions for transmitting trouble shooting instructions to the satellite media receiver to mitigate the service outage.

8. A satellite media receiver comprising:
a satellite port for receiving satellite signals;
a broadband port for receiving broadband signals; and
a controller programmed to:
transmit telemetry information to a network element;
receive via the broadband port a substitute portion of a media program in response to a detection by the network element of a service outage associated with delivery of the media program via the satellite port, wherein the detection of the service outage is based on the telemetry information, and wherein the substitute portion is received without the satellite media receiver transmitting a request for the substitute portion;
receiving a transcoded portion of the media program over an Internet service provider network to the broadband port of the satellite media receiver via a gateway; and
receiving to a digital video recorder service managed by the satellite media receiver the Internet service provider network a retrieved portion of the media program without transcoding responsive to detecting that the service outage occurred while the satellite receiver was recording the media program.

9. The satellite media receiver of claim 8, wherein the media program corresponds to at least one among audio content, and video content.

10. The satellite media receiver of claim 9, wherein the broadband port of the satellite media receiver is coupled to an Internet Service Provider network which is coupled to the network element, and wherein the controller is adapted to receive from said network element the substitute portion of the media program and present at a media device said substitute portion of the media program.

11. The satellite media receiver of claim 10, wherein the substitute portion of the media program is transcoded by the network element for purposes of transmitting a streaming signal to the broadband port of the satellite media receiver.

12. The satellite media receiver of claim 11, wherein the controller is programmed to:
transmit the telemetry information while the media program is presented by the satellite media receiver at a media device; and
present the transcoded media program at the media device.

13. The satellite media receiver of claim 10, wherein the controller is programmed to:
transmit the telemetry information while the media program is recorded by a Digital Video Recorder service managed by the satellite media receiver; and
redirect the Digital Video Recorder service away from the satellite port to record the substitute portion of the media program received from the broadband port.

14. The satellite media receiver of claim 8, wherein the telemetry information comprises at least one satellite signal distortion metric.

15. The satellite media receiver of claim 8, wherein the controller is programmed to transmit telemetry information associated with the service outage to a service agent of the satellite communication system.

16. A method comprising:
detecting a service outage associated with a primary media program processed by a satellite media receiver;
if the service outage occurs during a digital video recorder recording, then determining an extent that the service outage has affected the digital video recorder recording;
transmitting to the satellite media receiver a substitute portion of a media program responsive to detecting the service outage without a request for the substitute portion being transmitted by the satellite media receiver, wherein an entire media program is retrieved when the service outage caused a corruption of the Dial digital video recorder recording and wherein only a portion of the media program needed to restore an unrecorded portion is retrieved when the service outage caused loss of only a part of the media program; and
wherein the substitute portion of the media program is transcoded to match a Quality of Service capability of a broadband port of the satellite media receiver, and wherein a Quality of Service of the primary media program exceeds the Quality of Service of the substitute portion of the media program, and wherein the method comprises ceasing to transmit the substitute portion of the media program responsive to detecting that services have been restored.

17. The method of claim 16, wherein the satellite media receiver receives the substitute portion of the media program by way of a broadband port, wherein the satellite media receiver retrieves the primary media program from satellite signals of a satellite communication system supplied to a satellite media port of the satellite media receiver, and wherein the method comprises presenting trouble shooting instructions at the satellite media receiver.

18. The method of claim 16, comprising:
determining a location of the satellite media receiver;
determining a weather condition in the location; and
identifying the weather condition as a source of the service outage.

19. The method of claim 16, comprising determining from a pattern of one or more service outages associated with the satellite media receiver or one or more service outages of one or more other satellite media receivers whether a notice needs to be transmitted to a service agent to mitigate the detected service outage.

20. A portal, comprising a processor programmed to provide to a portable communication device over an Internet Service Provider network a substitute portion of a media program supplied by a satellite media receiver responsive to a detection of a service outage associated with a primary media program processed by the satellite media receiver, wherein the controller provides the substitute portion without receiving a request for the substitute portion from the satellite media receiver and wherein the substitute portion of the media program is transcoded to mate Qualify Service capability of a broadband ort of the satellite media receiver, and wherein a QoS of the primary media program exceeds the QoS of the substitute portion of the media program.

21. The portal of claim 20, wherein the satellite media receiver receives the substitute portion of the media program from a network element of a satellite communication system by way of a broadband port of the satellite media receiver.

22. The portal of claim 20, wherein the satellite media receiver retrieves the primary media program from satellite signals supplied by a satellite communication system to a satellite media port of the satellite media receiver.

* * * * *